United States Patent
Arakawa

(10) Patent No.: US 7,313,058 B2
(45) Date of Patent: Dec. 25, 2007

(54) OPTICAL DISK DEVICE AND METHOD FOR CONTROLLING OPTICAL DISK

(75) Inventor: Shinichiro Arakawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 554 days.

(21) Appl. No.: 10/928,752

(22) Filed: Aug. 30, 2004

(65) Prior Publication Data

US 2005/0243672 A1 Nov. 3, 2005

(30) Foreign Application Priority Data

Apr. 30, 2004 (JP) ............................ P2004-135561

(51) Int. Cl.
*G11B 7/00* (2006.01)
(52) U.S. Cl. ..................... 369/44.32; 369/53
(58) Field of Classification Search ............. 369/44.32, 369/275.3, 53.14, 53.15, 53.12, 53.17, 53.19

See application file for complete search history.

(56) References Cited

U.S. PATENT DOCUMENTS 6,661,769 B2 * 12/2003 Kadowaki et al. ....... 369/275.4

FOREIGN PATENT DOCUMENTS

| JP | 2003-168231 | 8/2003 |
| JP | 2003-317288 | 11/2003 |

* cited by examiner

*Primary Examiner*—Nabil Hindi
(74) *Attorney, Agent, or Firm*—Pillsbury Winthrop Shaw Pittman LLP

(57) ABSTRACT

Tilt of an optical disk is detected and controlled by detecting a tilt zone border based on a zone correspondence table expressing a ZCLV zone of the optical disk and the tilt zone including a border corresponding to the border of the ZCLV zone. The deterioration of accessibility within the ZCLV zone at the time of tilt control is reduced by the tilt zone having a border corresponding to the border of the ZCLV zone.

12 Claims, 10 Drawing Sheets

| TILT ZONE | 0 | 1 | 2 | 3 | ...... | 30 | 31 | 32 | 33 | 34 |
|---|---|---|---|---|---|---|---|---|---|---|
| ZCLV ZONE | 0 | 1 | 2 | 3 | ...... | 30 | 31 | 32 | 33 | 34 |

FIG.3A

| TILT ZONE | 0 | 1 | 2 | 3 | 4 | 5 | 6 |
|---|---|---|---|---|---|---|---|
| ZCLV ZONE | 0-4 | 5-9 | 10-14 | 15-19 | 20-24 | 25-29 | 30-34 |

FIG.3B

| TILT ZONE | 0 | 1 | 2 | 3 | 4 | 5 | 6 | 7 | 8 |
|---|---|---|---|---|---|---|---|---|---|
| ZCLV ZONE | 0-7 | 8-15 | 16-22 | 23-26 | 27-30 | 31 | 32 | 33 | 34 |

FIG.3C

OPTICAL DISK DEVICE AND METHOD FOR CONTROLLING OPTICAL DISK

CROSS REFERENCE TO THE INVENTION

This application is based upon and claims the benefit of priority from the prior Japanese Patent Application No. 2004-135561, filed on Apr. 30, 2004; the entire contents of which are incorporated herein by reference.

BACKGROUND OF THE INVENTION

1. Field of the Invention

The present invention relates to an optical disk device to record and reproduce data into and from an optical disk using a light beam, in particular, to an optical disk device to detect disk tilt, that is, a relative tilt angle of the disk recording surface with respect to an optical pickup.

2. Description of the Related Art

Densification of an optical disk can be achieved basically by increasing linear density and reducing track pitches. Also, in an optical system to irradiate the disk with a laser beam, densification and, at the same time, reduction of the beam spot diameter are required. The beam spot diameter is proportional to the wave length of the light source and inversely proportional to the numerical aperture (NA) of the objective lens. Accordingly, it is necessary to shorten the wave length of the light source as densification progresses.

Further, as densification of the optical disk advances, an influence of the disk tilt on recording/reproducing becomes large. Since occurring of a tilt to a disk deteriorates the signal recording characteristic and increases cross talks at the time of reproducing the signal, in an optical disk device to execute recording to media such as DVD-R/RW/RAM and the like, compensation by a tilt servo has been conventionally carried out. This tilt servo controls the optical pickup so that there is no tilt anymore.

Incidentally, the technology to perform the tilt control based on a focus error signal has been disclosed (refer to Japanese Patent Laid-open Application No. 2003-168231, and Japanese Patent Laid-open Application No. 2003-317288).

SUMMARY OF THE INVENTION

As for tilt control, it is conceivable to establish a tilt zone in which the amount of tilt correction of the disk is kept constant. In a disk having a CLV (Constant Line Velocity) system such as DVD±R/RW and the like, it is possible to arbitrarily select the number of divisions in this zone dividing and an interval between the zones.

Meanwhile, a ZCLV (Zone Constant Line Velocity) zone is established in a disk having a ZCLV format such as DVD-RAM disk and the like, and the number of rotations of the disk is kept constant in this zone. That is, in a border of the ZCLV zone, the number of rotations of the disk is changed. When the ZCLV zones and the tilt zones are complicatedly configured in such a ZCLV format type disk, there is a fear of causing deterioration of controllability. In other words, when a border of the tilt zone is arranged within a ZCLV zone, a waiting time for selection of tilt becomes necessary at the time of recording and reproducing within the same ZCLV zone, which possibly deteriorates the accessibility within the ZCLV zone.

The object of the present invention is to provide an optical disk device to realize prevention of deterioration in accessibility within a ZCLV zone.

To achieve the above object, an optical disk device according to an embodiment of the present invention including: a light-emitting element emitting a light beam to an optical disk having a ZCLV zone; a tilt controller controlling inclination of a surface of the disk based on reflected light reflected by the optical disk; a zone correspondence table expressing the ZCLV zone and a tilt zone including a border corresponding to a border of the ZCLV zone in correspondence; a tilt border detector detecting a border of the tilt zone based on the zone correspondence table; and an instructing unit instructing the tilt controller to control the tilt upon the border of the tilt zone being detected by the tilt border detector.

BRIEF DESCRIPTION OF THE DRAWINGS

FIG. 3A to FIG. 3C are schematic diagrams showing examples of correspondence relation between the tilt zones and the ZCLV zones, respectively.

DESCRIPTION OF THE EMBOIDMENTS

Figure 1:
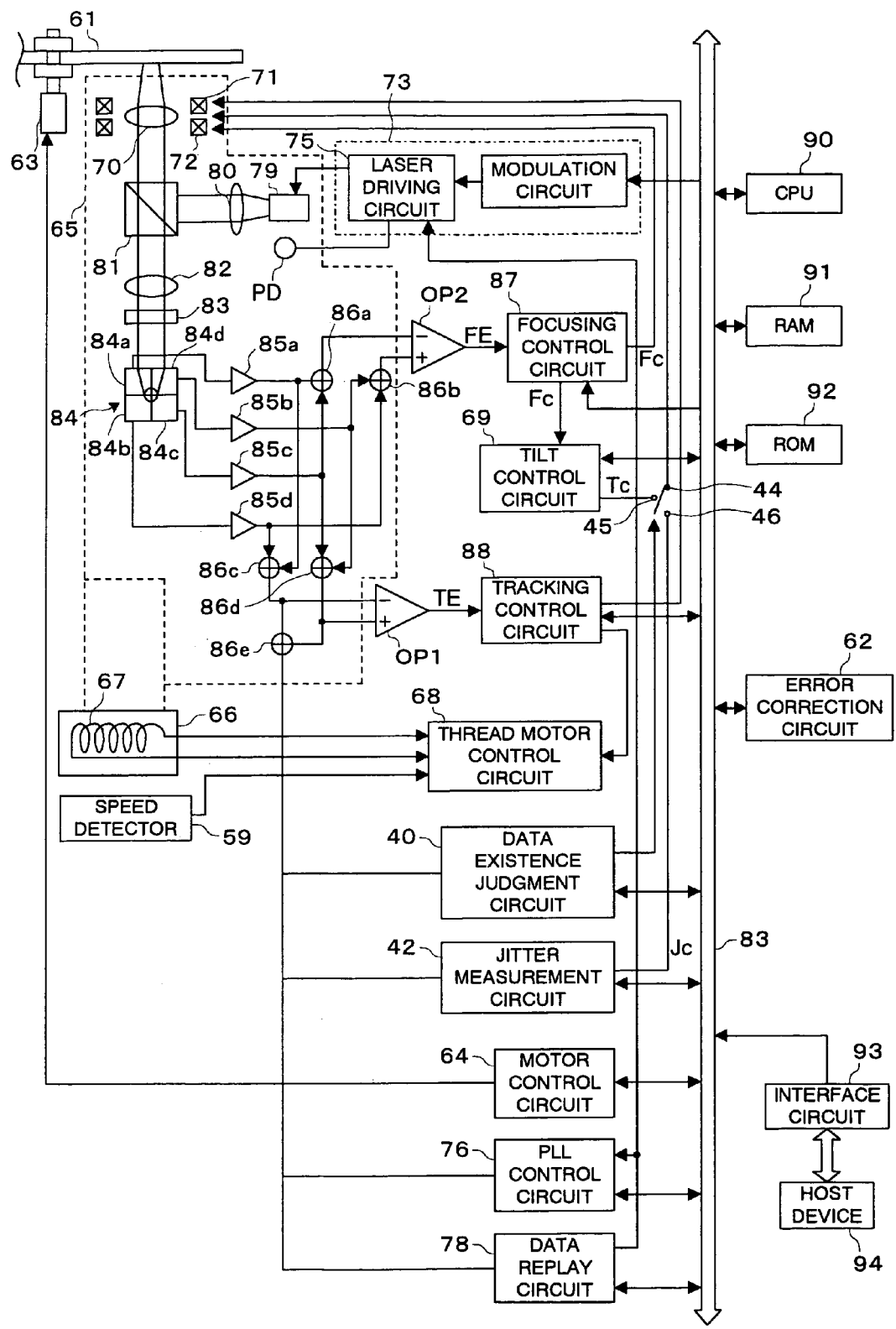
FIG. 1 is a block diagram showing a configuration of an optical disk device according to an embodiment of the present invention.

Hereinafter, embodiments of the present invention will be described in detail with reference to the drawings. FIG. 1 is a block diagram showing a configuration of an optical disk device according to an embodiment of the present invention. A land track and groove track are formed in spiral on the surface of an optical disk 61 as an optical recording medium, and the disk 61 is rotationally driven by a spindle motor 63.

Recording and reproducing of information to and from the optical disk 61 are carried out by an optical pickup 65. The optical pickup 65 is connected with a thread motor 66 via a gear, and the thread motor 66 is controlled by a thread motor control circuit 68.

A speed detecting circuit 59 is connected with the thread motor control circuit 68 and a speed signal of the optical pickup 65 to be detected by the speed detecting circuit 59 is sent to the thread motor control circuit 68. A permanent magnet (not shown) is provided on a fixing portion of the thread motor 66. A driving coil 67 is excited by the thread motor control circuit 68 so that the optical pickup 65 is transferred in the radial direction of the optical disk 61.

An objective lens 70 supported by a wire or a flat spring (not shown) is provided to the optical pickup 65. The objective lens 70 is able to move in the focusing direction (in the optical axis direction of the lens) by driving of a driving coil 72, and by driving of a driving coil 71, it is possible to move in the tracking direction (in the direction perpendicular to the optical axis of the lens).

A laser beam is radiated from a semiconductor laser diode 79 driven by a laser driving circuit 75 of a laser control circuit 73. The laser beam radiated from the semiconductor laser diode 79 is irradiated onto the optical disk 61 via a collimator lens 80, a half prism 81, and the objective lens 70. Reflected light from the optical disk 61 is led to a photo detector 84 via the objective lens 70, the half prism 81, a condensing lens 82, and a cylindrical lens 83.

The photo detector 84 includes four-part split light detecting cells 84a to 84d. Output signals of the light detecting cells 84a to 84d are supplied to differential amplifiers OP1 and OP2 via amplifiers 85a to 85d for current/voltage switching, and adders 86a to 86d.

The differential amplifier OP2 outputs a focus error signal FE corresponding to the difference between both output signals of the adders 86a and 86b. This output is supplied to a focusing control circuit 87. An output signal of the focusing control circuit 87 (focus control signal Fc) is supplied to the focusing driving coil 72. Thereby the laser beam is controlled to be kept always just focusing on a recording film of the optical disk 61.

The differential amplifier OP1 outputs a tracking error signal TE corresponding to the difference between both output signals of the adders 86c and 86d. This output is supplied to a tracking control circuit 88. The tracking control circuit 88 generates a track driving signal in accordance with the tracking error signal from the differential amplifier OP1.

The track driving signal outputted from the tracking control circuit 88 is supplied to the driving coil 71 in the tracking direction. Further, the tracking error signal used in the tracking control circuit 88 is supplied to the thread motor control circuit 68.

By the above-described focusing control and tracking control, change of the reflectance from pits or the like formed on the track of the optical disk 61 is reflected correspondingly to recorded information in the sum signal of the output signals from respective light detecting cells 84a to 84d of the photo detector 84, in other words, in an output signal from an adder 86e which adds both output signals from the adders 86c and 86d. This signal is supplied to a data reproducing circuit 78. The data reproducing circuit 78 reproduces recorded data based on a clock signal for reproducing from a PLL circuit 76.

When the objective lens 70 is controlled by the above-described tracking control circuit 88, the thread motor 66, namely the optical pickup 65, is controlled by the thread motor control circuit 68 so that the objective lens 70 is placed in the vicinity of the central position within the optical pickup 65.

A tilt control circuit 69 outputs a tilt correction signal Tc so that the objective lens 70 is tilted in accordance with the "warpage" of the disk 61, namely the tilt of the recorded surface, as will be described later. The tilt correction signal Tc is connected to one terminal 45 of a switching circuit 44. The tilt control circuit 69 executes this control based on a focus control signal.

A jitter measurement circuit 42 measures a correction value to make the jitter minimum based on the output signal of the adder 86e, and outputs a correction signal Jc so that the objective lens 70 draws near to the recording surface of the disk. The correction signal Jc is connected to the other terminal 46 of the switching circuit 44.

A data existence judgment circuit 40 judges whether or not data are recorded in the optical disk 61 based on the output signal from the adder 86e and outputs a data existence judgment signal. The switching circuit 44 connects a switch to the terminal 45 when data are found not to be recorded by the notice of the data existence judgment signal, and connects the switch to the terminal 46 when data are found to be recorded by the notice of the data existence judgment signal.

The motor control circuit 64, the thread motor control circuit 68, the laser control circuit 73, the PLL circuit 76, the data reproducing circuit 78, the focusing control circuit 87, the tracking control circuit 88, the tilt control circuit 69, the data existence judgment circuit 40, the jitter measurement circuit 42 and the like can be configured in one LSI chip as a servo control circuit, and these circuits are controlled by a CPU 90 via a bus 83. The CPU 90 comprehensively controls the optical disk device according to an operational command provided by a host device 94 via an interface circuit 93. The CPU 90 uses a RAM 91 as a working area, and performs a predetermined operation according to a program recorded in a ROM 92.

Tilt control of the optical disk 61 will be explained next. The optical disk 61 is assumed to be a ZCLV formatted disk in which a ZCLV (Zone Constant Line Velocity) zone is set, for instance, a DVD-RAM disk. When recording and reproducing within the ZCLV zone, the number of rotations of the disk is kept constant, and change of the number of rotations of the disk is carried out in the border of the ZCLV zone. Incidentally, as a disk in which the ZCLV zone is set, disks of DVD-R, DVD+R, DVD+RW can be cited other than DVD-RAM.

In the present embodiment, the deterioration of accessibility within the ZCLV zone due to tilt control is prevented by putting the ZCLV zone border in correspondence with the tilt zone border. The tilt zone is a region within which the amount of tilt correction of the optical disk 61 is kept constant. In other words, change of amount of the tilt correction is carried out in the border of the tilt zone.

Figure 2:
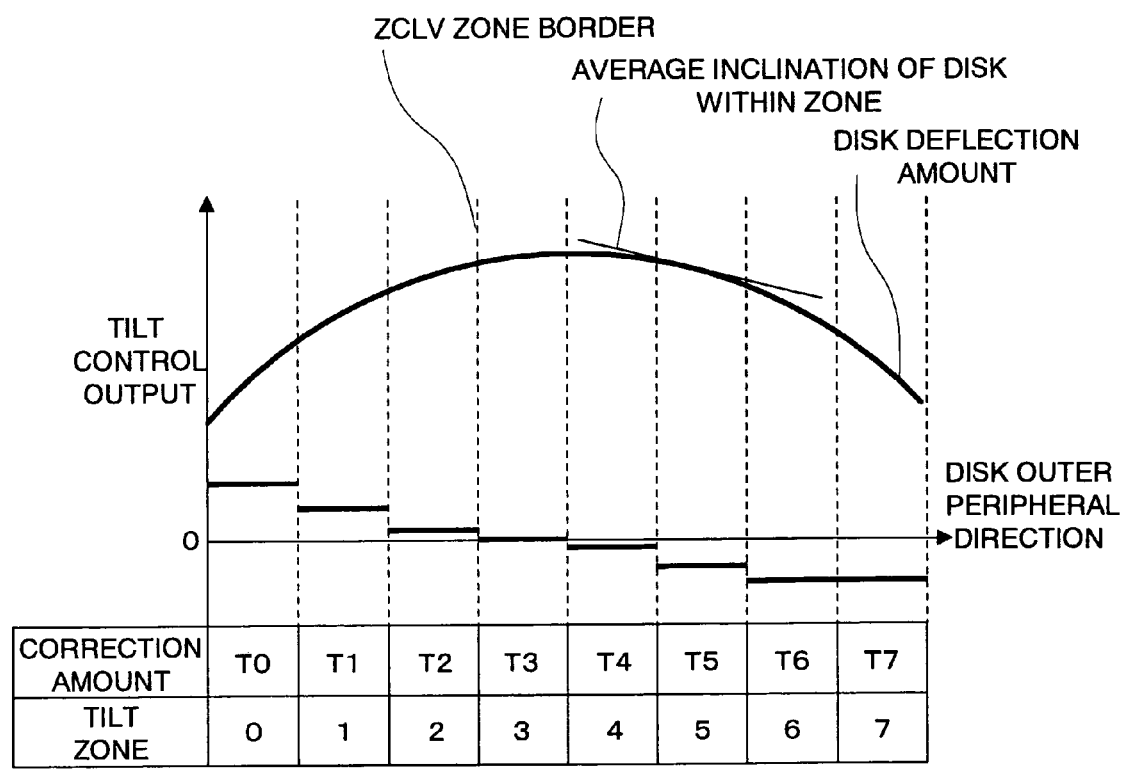
FIG. 2 is a schematic diagram showing a correspondence relation between a tilt zone and tilt correction.

FIG. 2 is a schematic diagram expressing correspondence relation between tilt zone and tilt correction. As described above, the tilt zone border coincides with the ZCLV zone border. As a result, tilt is to be changed only in the border of the ZCLV zone so that tilt correction can be carried out without affecting a random accessing property within the ZCLV zone.

The graph in FIG. 2 shows correspondence relation among amount of transferring in the disk radial direction, amount of disk deflection, and output of tilt control. Since the disk 61 is warped, the amount of disk deflection is changed in the radial direction. Accordingly, the tilt of the optical disk 61 is also changed in the disk radial direction. A tilt zone is provided in order to correspond to change of the tilt of the optical disk 61. As described previously, the tilt zone coincides in border with the ZCLV, and is a region within which amount of tilt correction is kept constant. In FIG. 2, the optical disk 61 is divided into 8 tilt zones 0 (zero) to 7, and respective tilt zones 0 (zero) to 7 correspond to amounts of the tilt correction T0 to T7. The amount of the tilt correction can be appropriately determined based on the tilt correction signal Tc in the vicinity of the tilt zone border. The amount of the tilt correction can be set from tables or the like in advance.

FIG. 3A to FIG. 3C are schematic diagrams showing examples of correspondence relation between the tilt zone and the ZCLV zone. In FIG. 3A, the tilt zone and the ZCLV zone are in one-to-one correspondence. In this event, control of the number of rotations of the optical disk 61 and tilt control of the optical disk 61 are performed in accordance with each other.

Figure 5:
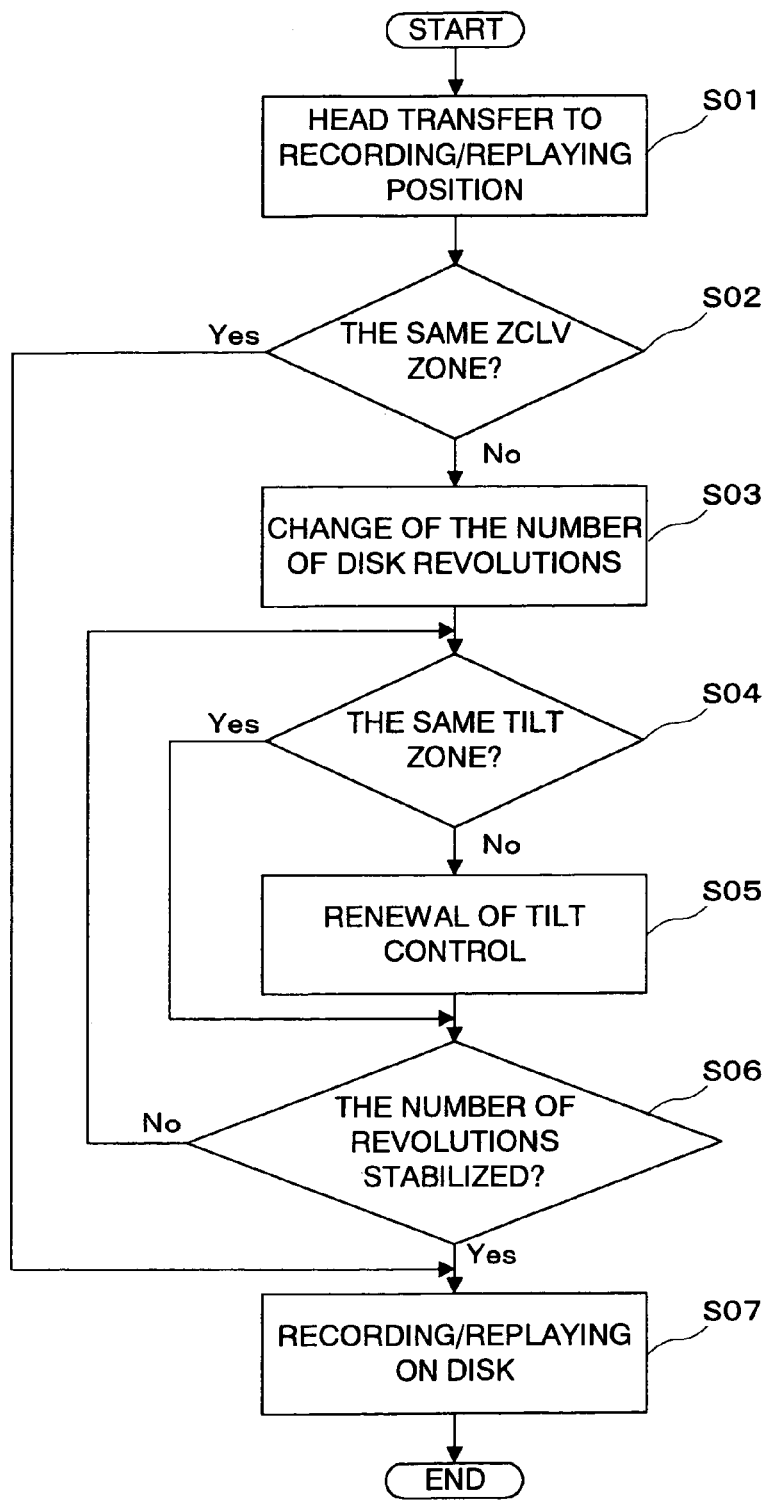
FIG. 5 is a flow chart showing an example of the operation procedure of the tilt correction according to the present embodiment.

In FIG. 3B, 5 ZCLV zones correspond to one tilt zone. In FIG. 3A and FIG. 3B, tilt zones are in equal intervals.

In FIG. 3C, the number of ZCLV zones corresponding to one tilt zone differs depending on each tilt zone, thereby realizing compatibility between efficiency of the tilt control and suitability. In other words, as shown in FIG. 2, warpage of the optical disk 61 differs depending on the position, which makes the tilt of the optical disk 61 dependent on distance. In a region where change in tilt of the optical disk 61 is small, the tilt zone is made wider, and in a region where change in tilt of the optical disk 61 is large, the tilt zone is made narrower, which results in realization of compatibility between efficiency of the tilt control and suitability.

Figure 4:
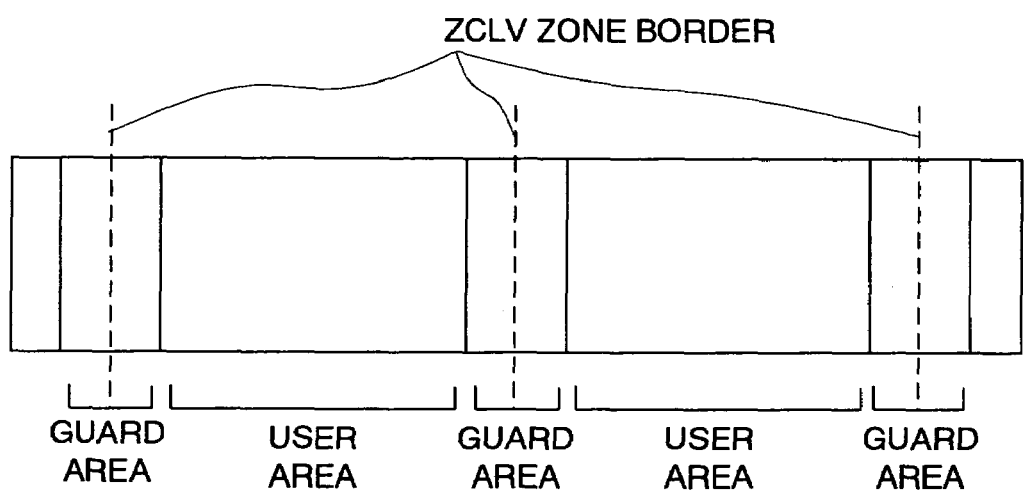
FIG. 4 is a schematic diagram expressing the vicinity of the ZCLV zone borders.

FIG. 4 is a schematic diagram expressing the vicinity of the ZCLV zone borders. In the borders of the ZCLV zone, guard areas where no recording and reproducing by users are supposed are disposed. From this fact, it is understood that the border of the tilt zone is not necessarily required to completely coincide with the ZCLV zone border, and is enough to be disposed in the guard area.

FIG. 5 is a flow chart showing an example of the operation procedure of the tilt correction according to the present embodiment. When performing recording/reproducing procedure, a optical pick up head (PUH) is transferred to a recording/reproducing position first (step S01). Here, initialization of tilt is supposed to have been completed. The details will be described later.

At this time, when a ZCLV zone at the present position coincides with a ZCLV zone at the destination, in other words, recording and reproducing are performed in the same zone, since renewal of tilt correction output is not required, an operation following the conventional procedure is executed. That is, after performing a seek operation for the position of destination, recording/reproducing operation is started (steps S02, S07).

When a ZCLV zone at the destination differs from the present zone, the number of rotations of a disk motor is changed (steps S02, S03).

Here, if the present tilt zone differs from the tilt zone of destination, renewal of tilt correction output is executed (steps S04, S05). Incidentally, the details of tilt correction will be described later.

Then, after stabilization of disk rotation, recording and reproducing onto/from the optical disk 61 is performed (steps S06, S07).

The operation for renewal of tilt correction output at step S05 can be completed in a substantially shorter amount of time compared with the waiting time for stabilization of rotation at the time of changing the number of rotations of the disk motor. Therefore, it is possible to complete the tilt correction operation with substantially no influence to the access time by performing the renewal operation of the tilt correction output while waiting for stabilization of rotation after change of the number of rotations of the disk 61.

As described above, by making the tilt zone coincide with the ZCLV zone, the following merit can be obtained. That is, when recording/reproducing is executed at the time when the ZCLV zone is at a different position, it is possible to neglect increase of execution time due to carrying out of tilt correction by performing tilt control during the waiting time for change of disk motor rotation. Further, when recording/reproducing is performed within the ZCLV zone, since no change of tilt correction is required, performance is not influenced at all.

Initialization of tilt will be explained next.

Figure 6:
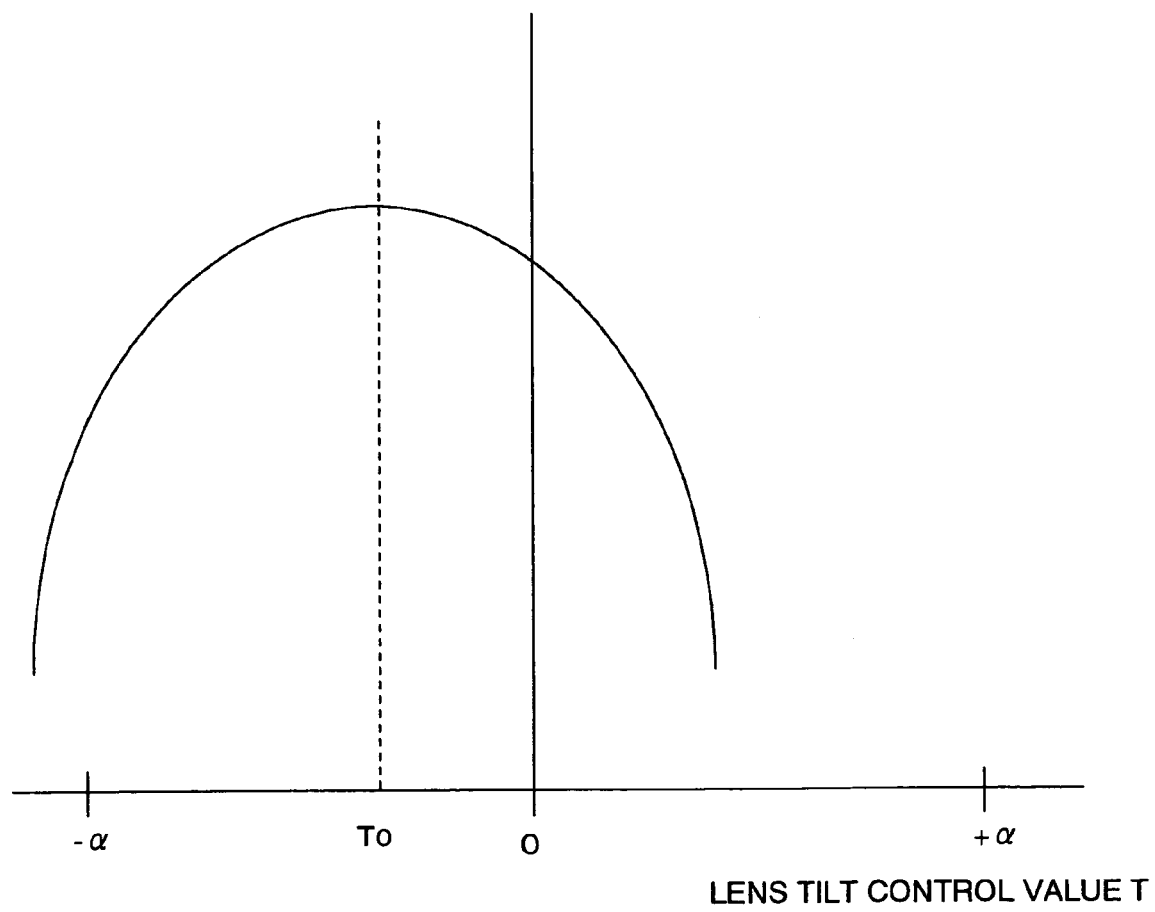
FIG. 6 is a view to explain initialization of the tilt.

When a new optical disk 61 in which no data are recorded is mounted on the optical disk device shown in FIG. 1, initialization of tilt is performed. At this initialization, the tilt in the innermost periphery of the disk is detected. FIG. 6 is a view to explain this detecting operation, in which the horizontal axis indicates a lens tilt control value T, and the vertical axis indicates an amplitude peak value Tp of the tracking error signal.

When focus control is executed and a light beam is in a state of just focusing on the disk surface, an AC signal is obtained as a tracking error signal. The tracking error signal is a signal generated by a light beam spot passing across a track on the disk when no tracking control is executed. Therefore, the tracking error signal has a frequency corresponding to the number of tracks on the disk to be crossed by the light beam spot in a unit of time.

When tilt of the lens is varied from, for instance, $-\alpha°$ to $+\alpha°$ at the innermost peripheral position of the disk, an amplitude peak value of the tracking error signal TE changes as shown in FIG. 6. FIG. 6 shows that the peak amplitude value of the tracking error signal TE is the largest when tilt is at T0. That is, reflected light of the light beam arrives at the light detecting cells 84a to 84d most efficiently. The lens tilt T0 at this time is an initial value of the tilt control.

Figure 7:
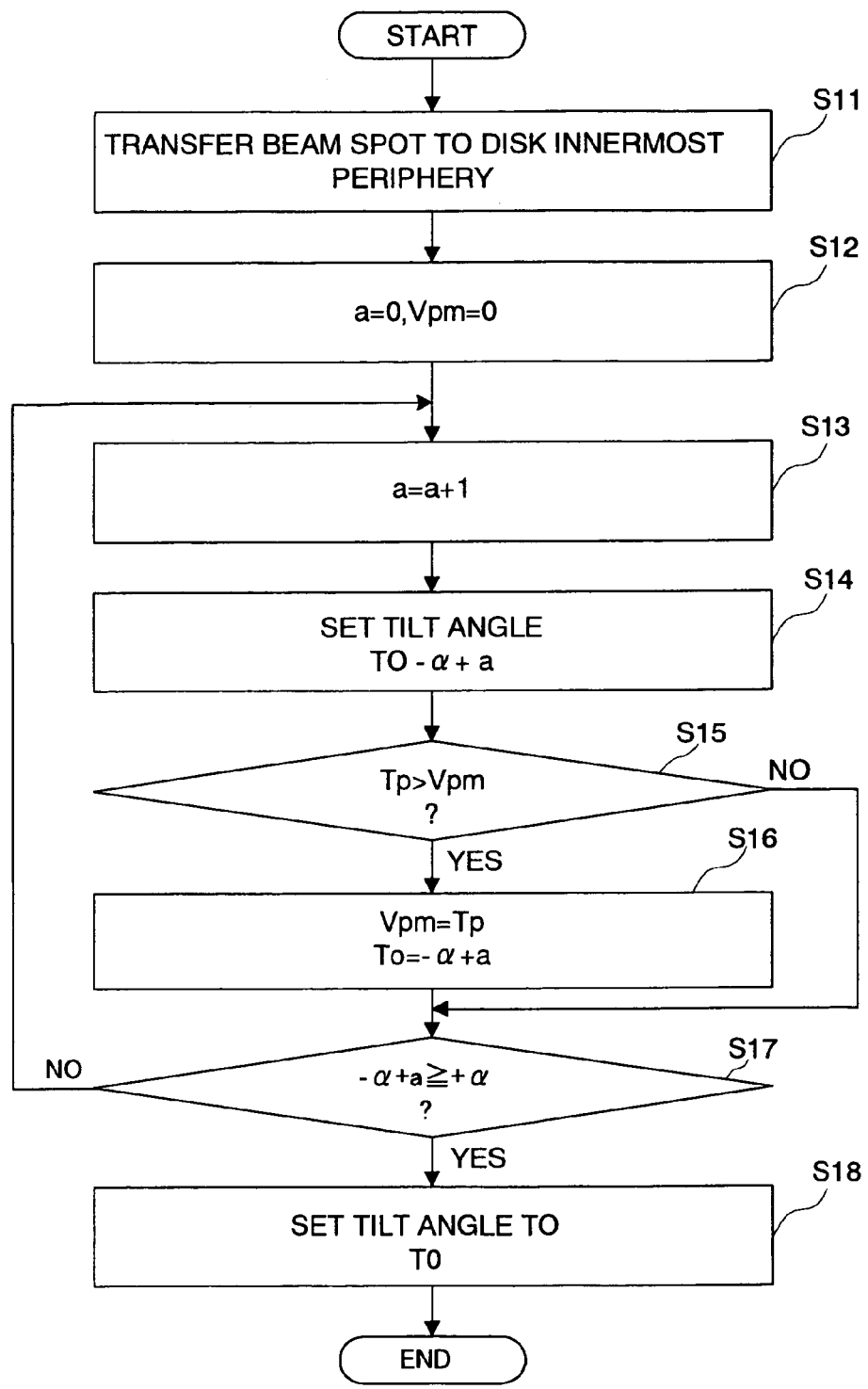
FIG. 7 is a flow chart showing an operation of the initialization.

FIG. 7 is a flow chart showing an operation of the initialization. As shown by step S11, the CPU 90 moves the pickup 65 so that the light beam spot positions at the innermost periphery of the disk. Next, as shown by step S12, 0 (zero) is substituted into variables "a" and "Vpm", and in step S13, a is increased by 1°.

In step S14, the CPU90 controls the lens tilt T to "$-\alpha+a$" using the tilt control circuit 69. In step S15, it is judged whether or not the amplitude peak value Tp of the tracking error signal TE is larger than Vpm. When Tp is smaller than Vpm (in the case of NO), the flow shifts to step S17, and when Tp is larger than Vpm (in the case of YES), as shown by step S6, the amplitude peak value Tp is substituted into Vpm, and the present tilt "$-\alpha+a$" is substituted into the optimum tilt T0.

In step S17, the CPU 90 judges whether or not "$-\alpha+a$" is equal to or more than $+\alpha$. When "$-\alpha+a$" is less than $+\alpha$ (in the case of NO), the flow returns to step S13, and the CPU 90 substitutes "a+1" into a. Thus, until "$-\alpha+a$" becomes $+\alpha$ or more, the procedure from step S13 to S17 is repeated. Accordingly, the variable Vpm shows the largest value among values Tp obtained by changing a tilt angle as in step S14.

When "$-\alpha+a$" is equal to or more than $+\alpha$ (in the case of YES) in step 17, the CPU 90 sets the tilt of the lens 70 to be T0 using the tilt control circuit 69. This makes the optical axis of the lens 70 and the perpendicular of the disk coincide with each other, and this initialization procedure is completed.

Incidentally, accompanying the above-described initialization of the tilt, detection of disk tilts on the overall surface of the disk is available. In that case, a disk inclination table indicating tilt of the entire disk-can be prepared. In this table, a distance in the disk radial direction and an inclination of the optical disk 61 are expressed in correspondence.

When the amount of tilt correction is determined based on the disk inclination table at the time of recording or reproducing of the optical disk 61, it becomes possible to omit detection of disk tilt.

The details of disk tilt detection will be explained next.

Figure 8A:
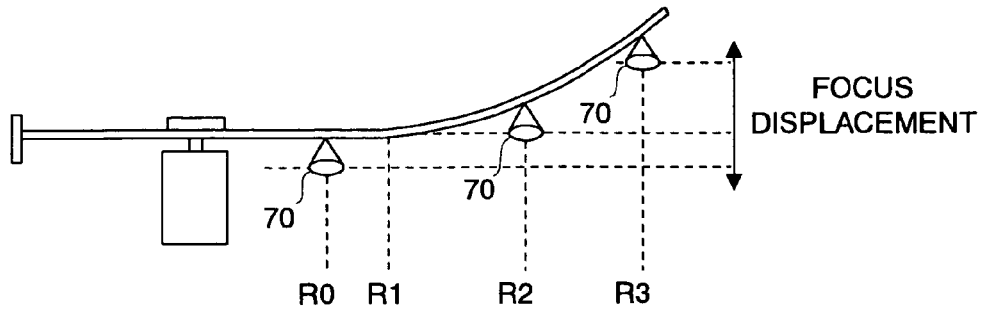
FIG. 8A is a schematic diagram to express tilts of the disk.
Figure 8B:
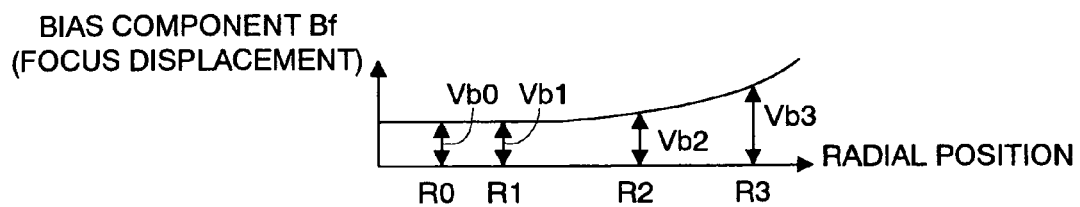
FIG. 8B is a graph expressing relation between positions in the radial direction of the disk and DC bias components of a focus driving signal.
Figure 8C:
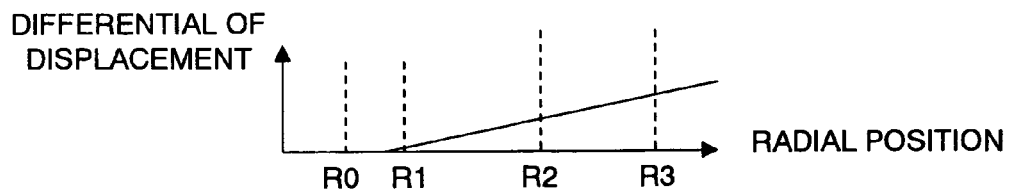
FIG. 8C is a graph expressing relation between positions in the radial direction of the disk and differential amount of focus displacement.

FIG. 8A to FIG. 8C are views explaining the principle of the disk tilt detection.

FIG. 8A is a schematic diagram to express tilts of the disk 61. As shown in FIG. 8A, when the optical disk 61 has warpage, a focus control system displaces the objective lens 70 in the direction of the disk warpage so that the position of a light beam focal point is adjusted to the recording surface of the optical disk 61. Here, since within the positional range at a radius R0 and at a radius R1, there is no warpage on the optical disk 61, the objective lens 70 is kept in a fixed height. Since warpage of the optical disk 61 occurs in a positional range at the radius R1 or more, the height of the objective lens 70 changes according to the position in the radial direction.

In response to the warpage of the disk 61, a DC bias component occurs in the focus driving signal. FIG. 8B shows the bias component (focus displacement amount) in response to the radial position. The bias component is shown as Vb0 at the innermost peripheral position R0, is shown as Vb1 at the disk radial position R1, is shown as Vb2 at a disk radial position R2, and is shown as Vb3 at a disk radial position R3. Note that, since the disk 61 has no tilt in the range between the disk radial positions R0 and R1, the bias components Vb0 and Vb1 are equal to each other.

FIG. 8C shows differential outputs of the focus displacement. It is seen from this drawing that the differential outputs are proportional to the tilts of the disk. Therefore, it is possible to detect the correction amount of tilt to the disk by measuring the inclination of the focus displacement.

Figure 9:
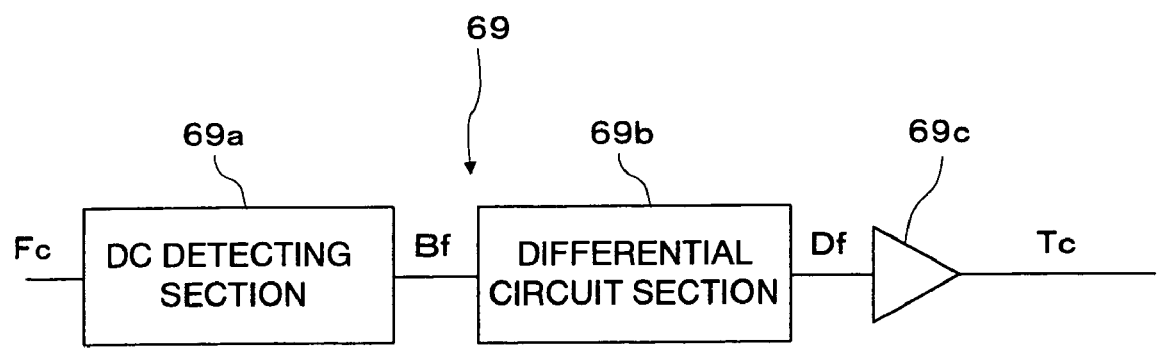
FIG. 9 is a block diagram showing a diagrammatic configuration of a tilt control circuit.

FIG. 9 is a block diagram showing a diagrammatic configuration of the tilt control circuit 69. The tilt control circuit 69 includes a DC detecting section 69a, a differential circuit section 69b and a driving section 69c. The DC detecting section 69a detects a DC bias component Bf of the focus control signal Fc, and the differential circuit 69b determines a differential value Df of the DC bias component Bf. The differential circuit 69b has a cutoff frequency in the vicinity of the number of rotations of the disk. The differential value Df is a signal proportional to the disk tilt. The driving section 69C generates the tilt correction signal Tc corresponding to the differential value Df. The correction signal Tc is supplied to a tilt actuator including the driving coils 71 and 72, and tilt correction is performed. It should be noted that the above-described DC detection and differential value detection are performed through digital operation procedure. Accordingly, the focus control signal Fc is a digital signal provided from a focusing control circuit 87.

Figure 10:
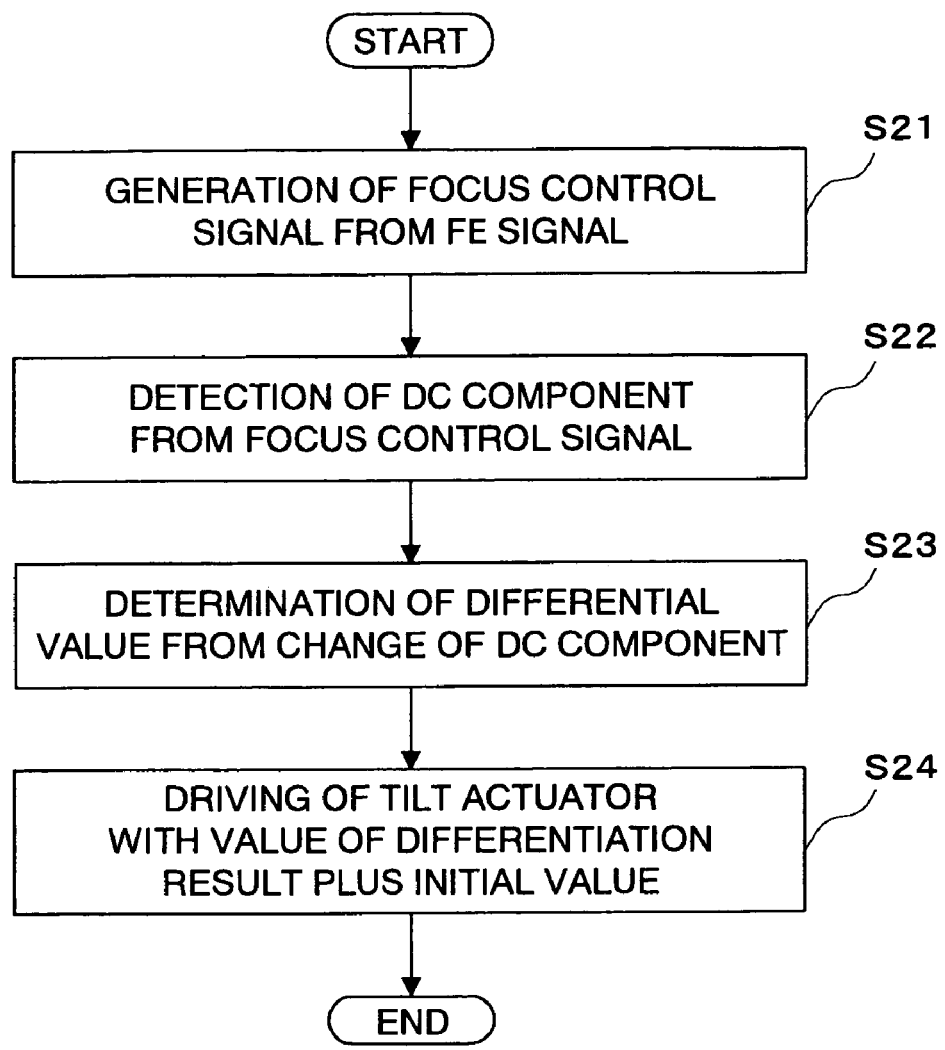
FIG. 10 is a flow chart showing a tilt correction procedure in detail.

FIG. 10 is a flow chart showing a tilt correction procedure in detail. This tilt correction is executed basically on a tilt border of the optical disk 61.

In step S21, the focusing control circuit 87 generates the focus control signal Fc from the focus error signal FE. In step S22, the DC detecting section 69a of the tilt control circuit 69 detects the DC bias component Bf shown in FIG. 8B from the focus control signal Fc and outputs it to the differential circuit section 69b.

In step S23, the differential circuit section 69b determines a differential value such as that shown in FIG. 8C from changes of the DC bias component Bf. For instant, the differential circuit section 69b determines a differential value from the present DC bias component Bf and a DC bias component Bf detected at the preceding tilt correction time.

In step S24, the driving section 69c generates the tilt correction signal Tc from a value of the differential value Df obtained by the differential circuit section 69b adding with an initial-value of tilt control, namely lens tilt T0, and drives the tilt actuator.

Accordingly, the DC bias component Bf is detected from the focus control signal Fc to generate a signal proportional to a disk tilt, namely, the tilt correction signal Tc via the differential circuit section 69b so that the driving section 69c drives the tilt actuator to perform correction of the disk tilt. A characteristic of this case is to execute correction of tilt angle relatively over along the disk radial direction based on the optimum point of the tilt calibrated at an inner peripheral position so that tilt correction can be performed when data is judged not to be recorded in the optical disk 61 by the data existence judgment circuit 40.

Other Embodiments

Embodiments of the present invention are not limited to the above-described embodiment, and possible to be enlarged or modified, and enlarged or modified embodiments are within the technical range of the present invention.

What is claimed is:

1. An optical disk device, comprising:
    a light-emitting element configured to emit a light beam to an optical disk having a ZCLV zone;
    a ZCLV border detector configured to detect a border of the ZCLV zone;
    a rotation controller configured to control rotation speed of the optical disk, the rotation speed being adjusted based on a detection of the border of the ZCLV zone by the ZCLV border detector and the rotation speed being kept constant without the detection;
    a zone correspondence table expressing the ZCLV zone and a tilt zone including a border corresponding to a border of the ZCLV zone in correspondence;
    a tilt border detector configured to detect a border of the tilt zone based on the zone correspondence table; and
    a tilt controller configured to control inclination of an optical head, the inclination being adjusted based on a detection of the border of the tilt zone by the tilt border detector and the inclination being kept constant without the detection.

2. The optical disk device as set forth in claim 1, wherein the border of the tilt zone is disposed in a guard area of the ZCLV zone border.

3. The optical disk device as set forth in claim 1, wherein the tilt zone includes a plurality of the ZCLV zones.

4. The optical disk device as set forth in claim 3, wherein the number of the ZCLV zones included in the tilt zone is fixed.

5. The optical disk device as set forth in claim 3, wherein the number of the ZCLV zones included in the tilt zone is varied with the position of the tilt zone.

6. The optical disk device as set forth in claim 1, wherein the optical disk is any of DVD-RAM, DVD-R, DVD+R, DVD+RW in type.

7. A method of controlling an optical disk, comprising:
    emitting a light beam to an optical disk including a ZCLV zone;
    controlling rotation speed of the optical disk, the rotation speed being adjusted based on a detection of a border of the ZCLV zone and the rotation speed being kept constant without the detection;
    controlling inclination of an optical head, the inclination being adjusted based on a detection of a border of a tilt zone based on a zone correspondence table expressing the ZCLV zone and the tilt zone including a border corresponding to a border of the ZCLV zone, and the inclination being kept constant without the detection.

8. The method of controlling the optical disk as set forth in claim 7, wherein the border of the tilt zone is disposed within a guard area of the ZCLV zone border.

9. The method of controlling the optical disk as set forth in claim 7, wherein the tilt zone includes a plurality of the ZCLV zones.

10. The method of controlling the optical disk as set forth in claim 9, wherein the number of the ZCLV zones included in the tilt zone is fixed.

11. The method of controlling the optical disk as set forth in claim 9, wherein the number of the ZCLV zones included in the tilt zone varies with the position of the tilt zone.

12. The method of controlling the optical disk as set forth in claim 7, wherein the optical disk is any of DVD-RAM, DVD-R, DVD+R, DW+RW in type.

* * * * *